(12) United States Patent
Spyridonos et al.

(10) Patent No.: US 9,552,612 B2
(45) Date of Patent: Jan. 24, 2017

(54) TAX DATA MANAGEMENT AND REPORTING SYSTEM

(71) Applicants: Nikolaos Spyridonos, Boca Raton, FL (US); Sadiq Samani, New York, NY (US)

(72) Inventors: Nikolaos Spyridonos, Boca Raton, FL (US); Sadiq Samani, New York, NY (US)

(*) Notice: Subject to any disclaimer, the term of this patent is extended or adjusted under 35 U.S.C. 154(b) by 0 days.

(21) Appl. No.: 14/145,984

(22) Filed: Jan. 1, 2014

(65) Prior Publication Data

US 2014/0195393 A1 Jul. 10, 2014

Related U.S. Application Data

(60) Provisional application No. 61/749,732, filed on Jan. 7, 2013.

(51) Int. Cl.
G06Q 40/00 (2012.01)

(52) U.S. Cl.
CPC .................................. G06Q 40/10 (2013.01)

(58) Field of Classification Search
CPC ........ G06Q 10/00; G06Q 20/00; G06Q 30/00; G06Q 40/00; G05Q 30/00
USPC ...................................................... 705/3–44
See application file for complete search history.

(56) References Cited

U.S. PATENT DOCUMENTS

| | | | |
|---|---|---|---|
| 7,249,072 B1 * | 7/2007 | Nearhood et al. | 705/31 |
| 7,680,707 B2 * | 3/2010 | Mottram | 705/31 |
| 7,933,820 B2 * | 4/2011 | Jafa et al. | 705/35 |
| 8,244,745 B2 * | 8/2012 | Lim | 707/758 |
| 8,423,560 B2 * | 4/2013 | Golwalkar et al. | 707/754 |
| 8,577,760 B2 * | 11/2013 | Rutsch et al. | 705/31 |
| 2005/0209867 A1 * | 9/2005 | Diesch et al. | 705/1 |
| 2006/0122919 A1 * | 6/2006 | Mottram | 705/31 |
| 2007/0174070 A1 * | 7/2007 | Jafa et al. | 705/1 |
| 2009/0187500 A1 * | 7/2009 | Wilson et al. | 705/31 |
| 2012/0036053 A1 * | 2/2012 | Miller | 705/31 |
| 2012/0197759 A1 * | 8/2012 | Neely et al. | 705/26.41 |

* cited by examiner

Primary Examiner — Frantzy Poinvil

(57) ABSTRACT

A system and method to manage, report and collect property tax information and data in real time, which may provide a means to transmit and communicate information from a plurality of tax information sources to a plurality of tax information targets.

13 Claims, 7 Drawing Sheets

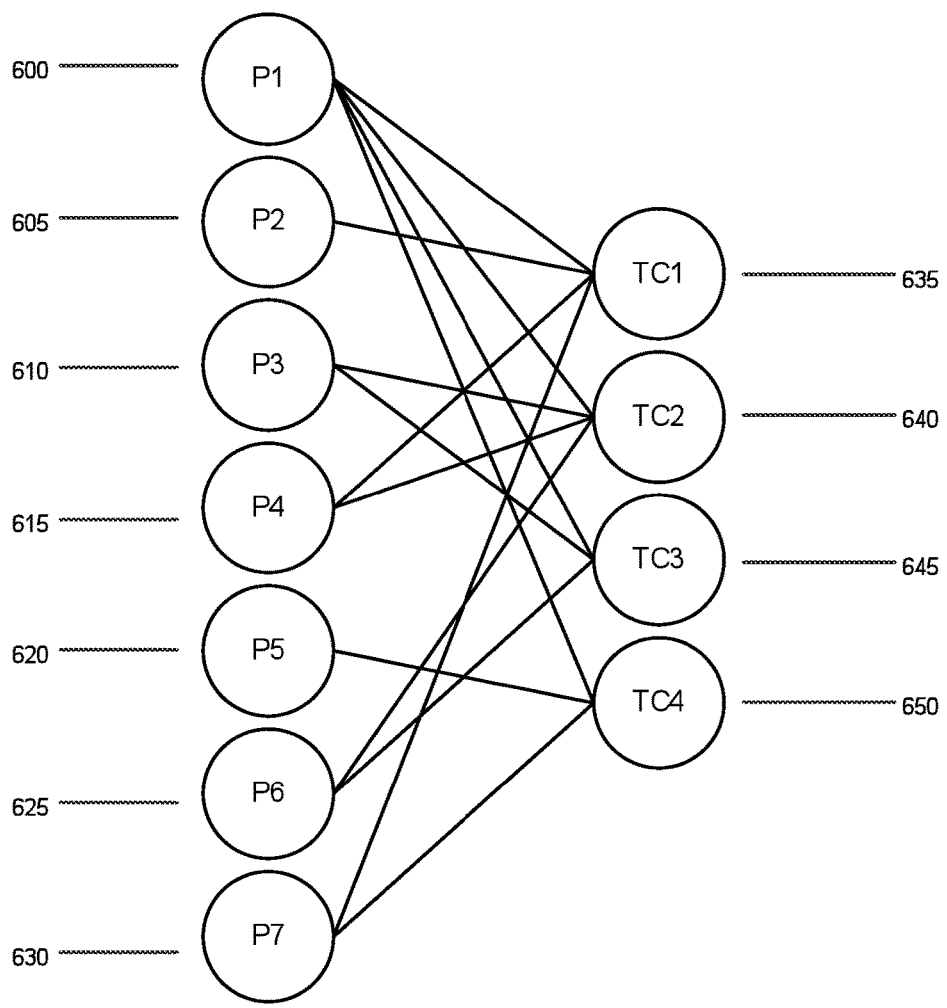

TAX DATA MANAGEMENT AND REPORTING SYSTEM

CROSS-REFERENCE TO RELATED APPLICATIONS

This application claims the benefit of U.S. Provisional Application No. 61/749,732, filed Jan. 7, 2013, entitled "Property Tax Data Reporting and Bulk Property Tax Payment System," which is hereby incorporated by reference in its entirety.

BACKGROUND OF THE INVENTION

I. Field of the Invention

The present invention relates to an online data management system, and more specifically an online system that allows a tax collector to distribute property tax data to a plurality of mortgage lenders, their tax servicing companies and bulk property tax payers via a web portal. That web portal may eliminate the sending of property tax data files to individual mortgage lenders, bulk property tax payers, and tax servicing companies and may replace it with a daily property tax data update that may ensure data integrity, may inform the mortgage lenders about when the tax collector collects property taxes, may validate the property parcel portfolios of mortgage lenders, bulk payers and tax servicing companies. The web portal may at the same time report the updated property tax data to the payers, including the updated amounts due for each property. The web portal may also allow the payers to perform a payment action that automatically creates and distributes a properly formatted payment file to the tax collector that is free of formatting errors, invalid parcel IDs, underpayments or overpayments and free of duplicate payments.

II. Description of the Related Art

Typically, a tax collector or local tax agency attempt to send tax information and other notices relating to property tax payments to various lenders or bulk payers through traditional offline means such as by mail, fax, phone, or the like. A tax collector will often have to separately send notices of payment, and collect property taxes from each lender and bulk payer it does business with one at a time through such traditional offline means. Any errors that have to be corrected are also corrected through traditional offline means.

Mortgage lenders escrow property taxes and pay those property taxes to the appropriate taxing agency or tax collector depending on where the property is located. Mortgage lenders escrow property taxes based on previous year's property tax assessments. Mortgage lenders need access to information regarding up-to-date property tax amounts. That information is distributed by taxing agencies or tax collectors in various offline or online forms. Typical methods of distributing that information is by means of paper bill copies, diskettes, CD-ROMs, magnetic tape, cartridges, email or FTP. To date, there is no standardized data format or output layout regarding the distribution of property tax data to mortgage lenders. Each mortgage lender must be capable of accepting a variety of formats in a variety of media, making data acquisition a very complex and fragmented process. Due to the complexity of this operation, most mortgage lenders use tax servicing companies to perform the duties of collecting property tax data from tax collectors, reporting those to each lender, and then paying the property taxes to each tax collector on behalf of each mortgage lender.

Tax servicing companies have to acquire the data from each tax collector in the same exact fashion as an individual mortgage lender. Tax servicing companies have to pay property taxes in bulk in the exact same way an individual mortgage lender would with the exception that data acquisition and tax payments are performed in bulk for all the mortgage lenders they service. Tax servicing companies have established a professional practice around acquiring, reporting and paying property taxes on behalf of mortgage lenders. Tax servicing companies maintain customer numbers for each of the lenders they service. They also must maintain a list of lender codes that get assigned to each of their mortgage lender customers. Since tax service companies work on a regional or national level, they maintain lender codes for each of their lender customers for each of the hundreds or thousands of tax collectors they receive data from and make payments to. Tax collectors on the other hand must keep track of lender codes and assign a new lender code for every new lender that operates in their tax district. The management of lender codes becomes a serious task for the tax collector and even more so for tax servicing companies.

Property tax collection periods vary from State to State, County to County, municipality to municipality or district to district. These could range from annual tax collections to quarterly collections. Some State statutes loosely define when these property tax collections must be held, therefore leaving the scheduling of these collections to the various taxing agencies. Mortgage lenders must be aware of when each taxing agency is collecting in advance in order for the Mortgage Lender to request access to the property tax data in order for the Mortgage Lender to begin the process of balancing their escrow accounts and paying property taxes on time. Tax collectors request from mortgage lenders bulk payments in various forms. These forms of payment vary from paper checks for each property tax that has been escrowed to ACH transactions for groups of property taxes or wire transfers. A standard method of payment has not been defined by the industry. Tax collectors require mortgage lenders to communicate which property parcels are being paid for by requesting a specific file to be sent to the tax collector along with the payment. The payment file is in a variety of formats and a variety of layouts varying from tax collector to tax collector.

From time to time a tax collector may also need to add one or more lenders and bulk payers to their approved list of bulk payers in order to provide to them property tax data and collect property tax payments. The addition of the new lender or bulk payer to the approved list of lenders or bulk payers is done by offline means in which phone calls, letters and emails are needed. The tax collector would also only learn if the prospective lender has acknowledged being connected to the tax collector through a traditional offline means. A period of time typically associated with offline means of communication would also follow before a tax collector would learn if a prospective lender has accepted the invitation to be connected to the tax collector.

A tax collector might also have to collect property taxes from lenders without being able to remind lenders in a timely manner of when payments are due, or if payments are past due with traditional offline means. A tax collector may also receive duplicate payments on property taxes from one or more lenders wherein a lender mistakenly believes that it is still responsible for a payment parcel that is no longer in its possession. In other cases, the tax payer may pay their own property taxes in error without knowing that their lender is responsible for paying their property taxes via escrow. This will cause a refund to be issued by the tax collector. The refund may be issued to the tax payer, the lender, or whomever paid last. Issuing refunds is one of the most involved processes for a tax collector since it requires involvement from all the departments of the tax collector's office and in many instances requires coordination between the payers and the tax collector to determine who must receive the refund. The issuance of refunds is a lengthy process that can take weeks to months and as long as one year to complete. During that period, all the parties involved in the refund process must continuously attend to that process by requesting status on the refund from the tax collector, receiving phone calls and letters from tax payers that want their money back and having confusion about why the refund has not been issued. There is a risk of duplicate payments along with the risk of failure to issue refunds by tax collectors.

A few weeks to a few months prior to the property tax collection period, most tax collectors request mortgage lenders to submit a list of the property parcels they plan to pay for during the property tax collection period. The submission process is done by a variety of means and media ranging from paper lists to emailed lists and from plain text files to specifically formatted data files. Depending on the State Statute, tax collectors use the information submitted by mortgage lenders to print on the property tax bills the information of the mortgage lender that is responsible for paying the property tax bill. The tax collectors may also use the information to suppress the printing of the property tax bill, or to print a property tax statement instead of a property tax bill, with the goal that the tax payer will refrain from a duplicate payment of the property tax bill in error. The process of eliminating the duplicate payment of the property tax bill will subsequently reduce the possibility of the tax collector issuing refunds. An efficient online process may help inform mortgage lenders about when tax collectors need this information and provide the data format in which mortgage lenders must submit this information.

Apart from mortgage lenders and tax servicing companies there are a number of groups that are responsible for paying property taxes in bulk. These are property management companies, real estate developers, utility companies, land managers, theme parks, utilities, title companies and individual large property owners. These groups do not participate in the offline bulk property tax process used between mortgage lenders and tax collectors because they do not have the information technology resources to be able to produce complicated property tax payment data files. These groups pay property taxes by sending paper checks through the mail or by paying in person at the tax collector's office many times occupying a teller for hours at a time and creating high transaction costs for the tax collector.

Many tax collectors collect property taxes from individual tax payers online by allowing tax payers to pay individual property taxes by credit or debit card or electronic check. There is no established method to prevent a tax payer from paying on a property tax that a mortgage lender has escrowed and is expecting to pay. This happens because mortgage lenders pay property taxes very close to the due date of the property taxes and the system that present property tax information to individual payers for the purpose of accepting online payments does not utilize a real-time database shared by mortgage lenders. A unified database system may be used by all types of payers, mortgage lenders, tax servicing companies, bulk payers and individual payers for the bill presentment of property tax information and the processing of property tax payments.

SUMMARY

The present invention relates to an online data management system, and more specifically an online system that may allow a tax collector to distribute property tax data to a plurality of mortgage lenders, their tax servicing companies and bulk property tax payers. With over 21,000 tax collectors and over 7,000 mortgage lenders in the United States, as well as thousands of large property owners that pay property taxes in bulk, a tax collector may collect property tax payments from a various lenders as defined by State statute. As mortgage lenders escrow property taxes and calculate annual escrow amounts based on previous year's property taxes, mortgage lenders are in need of the most up-to-date property tax information from each and every tax collector's jurisdiction they have property liens. Tax collectors distribute property tax information anywhere between thirty to sixty days before the property tax due date to participating lenders that have requested the property tax information using various methods. These methods include the creation of data CD-ROMs and subsequent delivery to mortgage lenders via courier or USPS, sending data via email, or uploading a data file to the tax collectors FTP server for pickup by mortgage lenders.

All the above data delivery methods have one thing in common which is that the moment the data is created it is no longer current. Changes continue to happen during the last thirty to sixty days on the property taxes. These changes are a) over-the counter payments by tax payers that are not aware that their mortgage lender is paying their taxes via escrow, b) property tax corrections due to exemptions or tax appeals being filed by tax payers, c) property refinancing or sale on the closing of which the property taxes are paid by a title company. All the above changes take place without the mortgage lenders being aware of them.

In addition to the changes, mortgage lenders often maintain poor property roll records and pay on property taxes that they no longer escrow, or simply maintain erroneous property parcel identification codes that result in the attempt to pay on non-existing properties. Due to problems of ensuring distribution of persistent updated property tax data and the occurrence of duplicate payments between two mortgage lenders or a mortgage lender and their customer taxpayer resulting from the traditional means of property tax data and delivery methods, a tax collector may utilize a real-time data management system to allow for the frequent updating and reporting of property tax data to various lenders and bulk payers ("payers") in order to distribute the most current property tax data. A real-time data management system may validate mortgage lender portfolios and report duplicate property parcels on mortgage lenders' portfolios and block the payments of such. In addition, a real-time data management system may collect property tax payments from the mortgage lender and bulk payers while eliminating payment errors due to invalid or unreadable data files, and prevent payers from submitting duplicate payments for the same property parcel.

To achieve the foregoing objects, and in accordance with the purposes of the invention as embodied and broadly described in this document, there is provided a an online system that allows a tax collector to distribute property tax data to a plurality of mortgage lenders, their tax servicing companies and bulk property tax payers via a web portal.

That web portal may eliminate the sending of property tax data files to individual mortgage lenders, bulk property tax payers, and tax servicing companies and may replace it with a daily property tax data update that may ensure data integrity, may inform the mortgage lenders about when the tax collector collects property taxes, may validate the property parcel portfolios of mortgage lenders, bulk payers and tax servicing companies. The web portal may also report to the payers the updated property tax data, which may include the updated amounts due for each property and may allow the payers to perform a payment action that may automatically create and distribute a properly formatted payment file to the tax collector that is may be free of formatting errors, invalid parcel IDs, underpayments or overpayments and may be free of duplicate payments.

The current invention allows mortgage lenders or their tax servicing companies to upload a list of their parcel portfolios along with escrowed amounts and instantly receive reports of the differences between what has been escrowed by the mortgage lender and the property tax due at the time of the tax collection. This is done through the upload process of a text file that contains the property parcel ID as well as the escrowed amount. The current invention may match the property parcel ID to the appropriate property and creates a report that displays the current tax due as well as the difference between what is due and what was included in the escrowed field uploaded to the system.

Property tax collectors in various areas report property taxes by breaking up each taxing district's property tax assessments into a separate record. The sum of all these records for the parcel identification makes up the total amount due. Mortgage lenders typically have to extract all the taxing district assessments for each of their parcels they are responsible for payment and add all the taxes due in order to calculate the total tax due for the property parcel. The current invention may utilize automated tools that summarize the total tax due for each parcel and at the same time may provide the detailed break down for each taxing district to the mortgage lender. The mortgage lender pays the total amount due for the parcel and the current invention may generate a payment file that may be transmitted to the tax collector which contains the breakdown of each taxing district for the specific property parcel. This invention may simplify the transmission of property tax bill details and breakdowns, standardizing the reporting of that information to a unified format independent of the individual tax collector. Payment files may be generated independently of the payer while it may contain the granularity and detail required by the tax collector and may be in the format required by the tax collector.

Tax collectors in many areas of the United States collect property taxes more than one time per year. These collection periods are called installments. In some states lenders and bulk payers in general are allowed to pay one, two, three or all four installments at one time. For example, a lender may pay first, second, third and fourth installment of the property taxes if it so chooses during the first installment collection period. In order for that to be done mortgage lenders must extract all installment payment details from the tax collector's data file, summarize all the installment amounts for the property taxes of their choice, and send a properly formatted payment file to the tax collector along with the payment. The current invention may allow the mortgage lender to select the number of payments to be included for specific parcels at the time of parcel list upload, and may do so using a specific field that may indicate to the system what installments the mortgage lender wants to pay.

BRIEF DESCRIPTION OF THE DRAWINGS

Many aspects of the disclosure can be understood with reference of the following drawings.

FIG. 3(a) illustrates the connections between mortgage lenders or bulk payers with tax collectors within the current invention.

DETAILED DESCRIPTION

Hereinafter, exemplary embodiments of the present invention will be described in detail with reference to the accompanying drawings. In the following description of the present invention, a detailed description of known configurations and functions will be omitted when it may make the subject matter of the invention unclear.

Figure 1A:
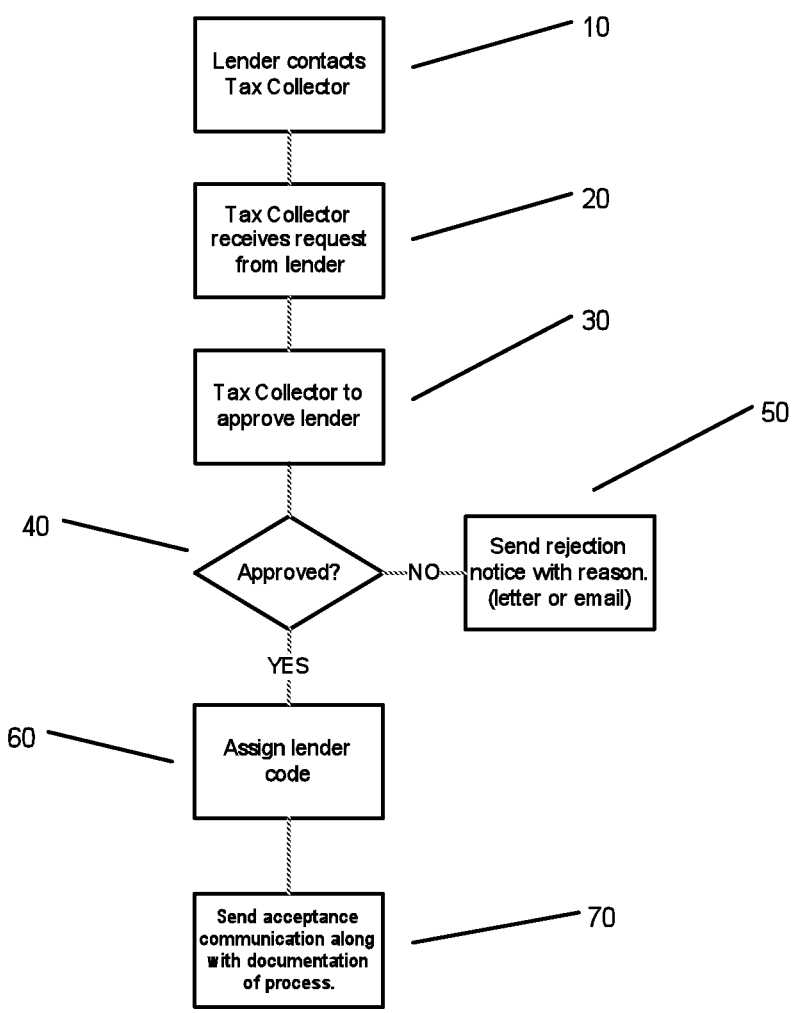
FIG. 1(a) illustrates the current method of a tax collector approving or rejecting a mortgage lender or bulk payer.

FIG. 1(a) illustrates a typical relationship between a bulk payer to a tax collector in accordance with the prior art. In a typical relationship, a lender sends a request 10 to a tax collector, and the tax collector then has receipt 20 of the request 10. The request 10 is usually sent by a traditional offline means such as by e-mail, regular mail or by fax. The tax collector then has to provide verification 30 of the lender. The verification 30 is done by phone, e-mail or by requesting additional information from the lender, such as the number of parcels that may be escrowed in the tax collector's jurisdiction. After the verification 30 is complete, the tax collector sends either an approval 40 or a rejection 50 to the lender by a traditional offline means described above. If the tax collector has sent an approval 40 to the lender, the tax collector then assigns the lender a lender code 60, and then may also send an acceptance 70 of the relationship between the lender and the tax collector. The acceptance 70 is usually accompanied with a technical guide on what property tax data request formats the tax collector requires from the lender. The format of the data request varies from tax collector to tax collector and the communication protocol may differ from tax collector to tax collector.

Figure 1B:
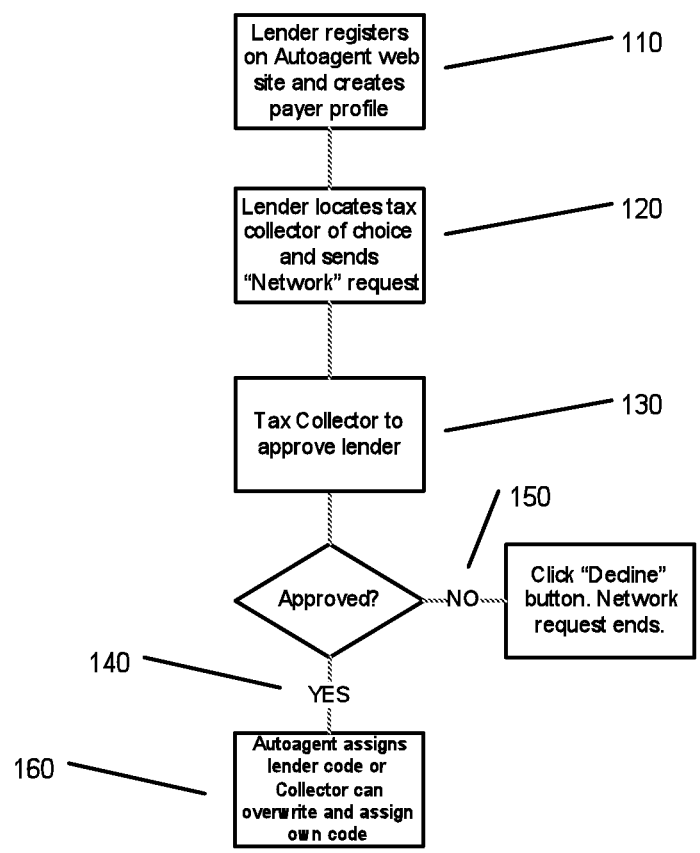
FIG. 1(b) illustrates one embodiment of the current invention of how this online system allows for the request by a mortgage lender to connect with a tax collector and the approval process of that lender.

FIG. 1(b) illustrates the relationship between mortgage lenders and bulk payers to tax collectors making use of Autoagent. Lender may register on the Autoagent web portal which may create the lender's profile 110. Lender may then locate the tax collector of their choice and may send a network request 120. The network request 120 may be an electronic invitation to the tax collector that may request addition of that lender or bulk payer to the tax collector's network of payers. Tax collector may receive the request 120 and may have the option to approve or decline 130 the request 120. The tax collector may decline the request 120 by clicking a decline button 150. The network request 120 may then terminate. If tax collector so chooses to accept 140 the lender or bulk payer to their network, the request 120 may be accepted and the tax collector may choose at this time or at a later time to assign a lender code 160 to that payer.

Figure 2A:
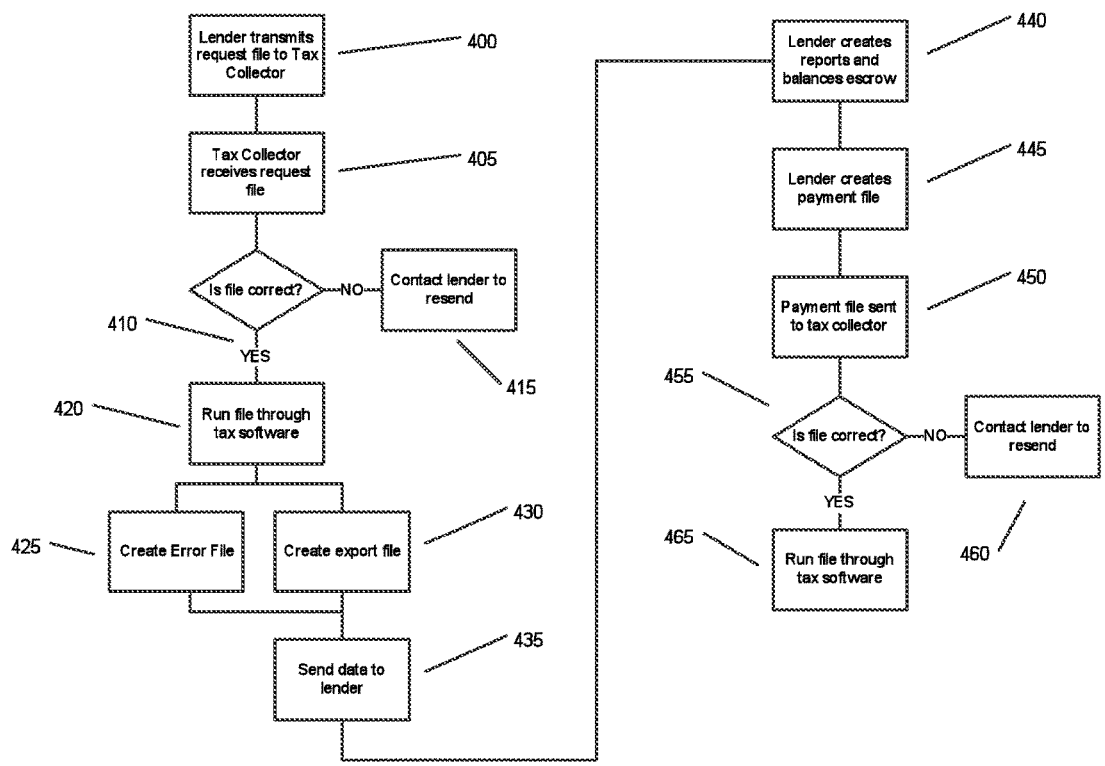
FIG. 2(a) illustrates the current offline method of property tax data request by mortgage lenders, distribution of property tax data by tax collectors to the lenders, error checking and delivery of payment files from the lenders to the tax collectors.
Figure 2B:
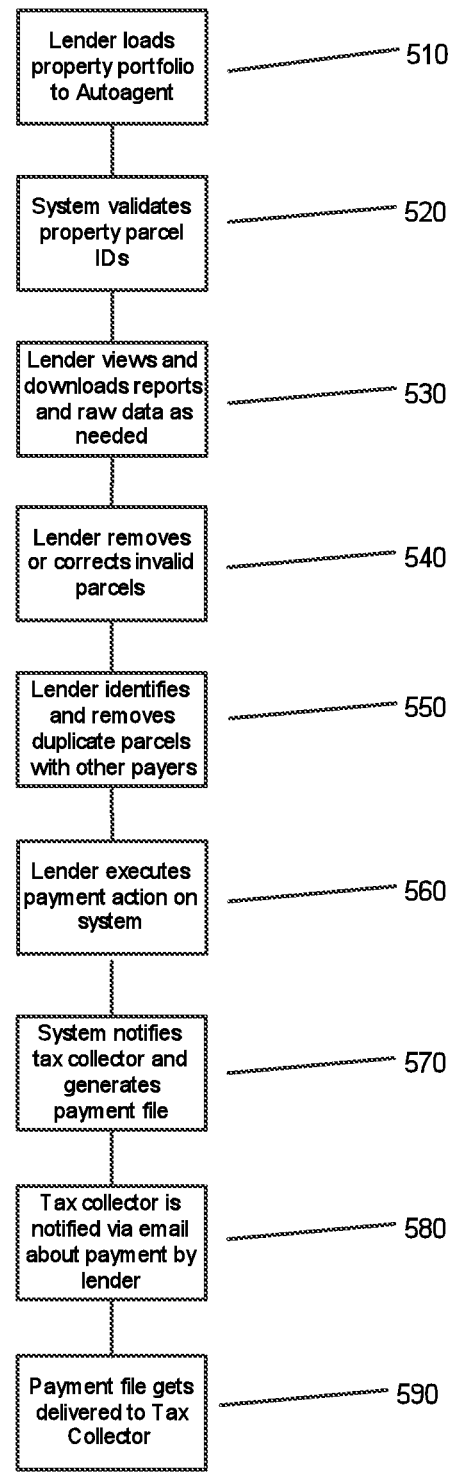
FIG. 2(b) illustrates one embodiment of the current invention's overall data request, delivery of property tax data to payers, property portfolio validation and subsequent delivery of payment files to tax collectors.

FIG. 2(*a*), depicts a typical relationship between a mortgage lender or bulk payer and tax collector using the current offline method. The lender will transmit a request 400 to a tax collector in specific format that is varied for each tax collector. The delivery medium of the request 400 may be via email, disk, FTP transfer and the request 400 file may be in a variety of data formats and layouts. When the tax collector has receipt 405 of the request 400, the tax collector determines if the file is correct, or that it should be resent 415 to the tax collector. The communication to resend 415 is done via email, letter, rejection file of varying formats or phone and fax. If the request 400 has to be resent to the tax collector, it is typically because the tax collector is unable to read the file or the file is not in the format used by that tax collector. If tax collector determines that the request 400 is correct 410, the request file 400 is manually processed through a tax software 420 during which every record is validated and property tax details are extracted from the tax collector's internal database. During step 420, if any of the individual records on the request file 400 are not in the appropriate format or cannot be validated, an error file 425 can be created. If the request file 400 is in an acceptable format, an export file 430 is created, and the data 435 is sent to the lender. The data 435 contains detailed property tax records for each property parcel requested along with property tax due, and assessor property data. The data 435 is sent via CD-ROM, email, FTP and in some rare cases in the form of paper property tax bills. This request 400 is typically performed thirty to sixty days before the tax due date. The data 435 is sent to the mortgage lender or bulk payer within thirty to forty five days before the tax due date. The moment data 435 is produced and sent changes continue to take place at the tax collectors tax software 420. These changes may include property tax adjustments, property tax payments by tax payers or a third party like a different lender or title company. These changes are not transmitted to the bulk payers since the data 435 was sent in the past and the data contained in data 435 is based on the copy of the data at the moment of file 435 extraction and production of the data file 435.

The lender or bulk payer prepares reports 440 and balances escrow accounts if so applicable. As the tax due date approaches the lender or bulk payer creates a payment file 445 which must match the payment file format of the tax collector. The payment file 445 is sent to the tax collector 450. The payment file 445 is transmitted using a variety of methods, CD-ROMs, emails, FTP transfers depending on what is acceptable by the tax collector. The tax collector receives payment file 445 and examines the file 455 for formatting errors. If file 445 is incorrect the tax collector notifies the lender or bulk payer to resend the file 445 in the correct format 460. The notification 460 is transmitted by email, phone or letter. If the file 445 is correct then it is imported into the tax collector's internal software 465 and is processed. At times the tax collector may be required to alter the file 445 before importing it to the internal software 465 because the file 445 may be too large for the internal software 465 to handle.

FIG. 2(*b*) illustrates a relationship between a mortgage lender or bulk payer to a tax collector under one embodiment of the present invention. At step 510, the lender may load their property portfolio to Autoagent by a file upload that may contain at a minimum a list of property identification codes on the web portal or Autoagent website. At step 520, the Autoagent system may validate each property identification code against the database of the tax roll of the tax collector. At 530, the mortgage lender or bulk payer may view and may download reports of the status of each of their properties in regard to property taxes. Raw data in the standardized Autoagent format may also be downloaded at step 530. Invalid property identification codes that may exist in the lender's or bulk payer's portfolio appear in a separate report 540 and may be identified and may instantly be removed or may be corrected by the mortgage lender or bulk payer. The Autoagent system may be configured to disallow invalid property parcel identification codes to be further processed or submitted for payment to the tax collector. The mortgage lender may then identify and removes any duplicate parcels it may have with other mortgage lenders or bulk payers at step 550. The Autoagent system may block payment on any property parcel identification codes that exist in the property portfolios of more than one mortgage lender or bulk payer. At step 550, the system may also share each of the conflicting mortgage lenders and bulk payers contact information with each other and may encourage each conflicting payer to contact the other payer to determine which mortgage lender is supposed to pay the property tax for the conflicting property.

At step 560, the mortgage lender may execute a payment action on Autoagent which may combine the total tax due for all the property taxes on the mortgage lender's portfolio. The amount due generated during step 560 payment action may be based on the most recently updated tax data file submitted to Autoagent by the tax collector. Upon completion of the payment action step 560 the system may notify the tax collector of the incoming payment from the mortgage lender or bulk payer and may generate a payment file 570 that matches the tax collectors payment file specifications. The payment file 570 may be automatically generated by the system based on pre-programmed specifications. The tax collectors may then receive advanced notice 580 of incoming wire transfers since other methods of payment may be prohibited on Autoagent. Having advanced notice 580 of the incoming wire transfers, the tax collector may then notify their receiving bank to have the collateral in place for successful receipt of the incoming wire transfer. The payment file 590 that may be generated by Autoagent may be delivered to the tax collector in the file specifications required by that tax collector.

Figure 3B:
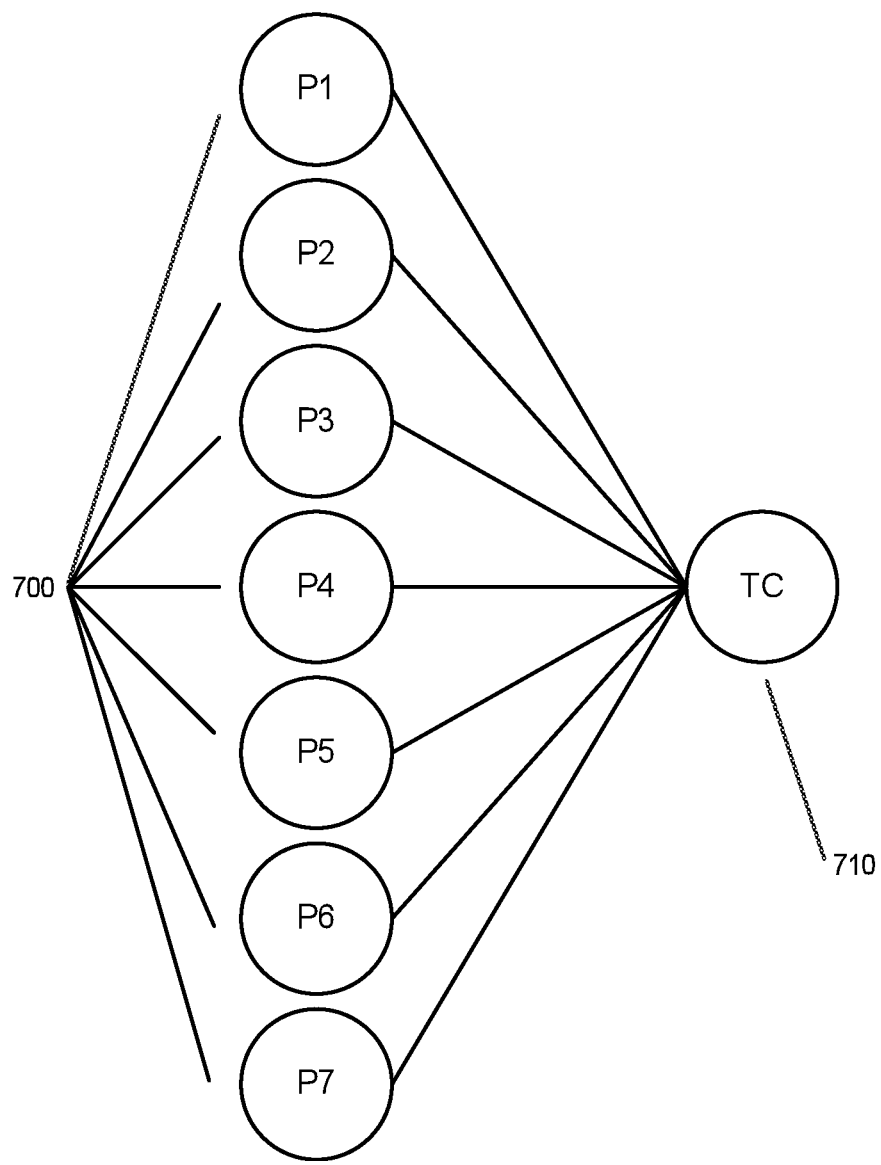
FIG. 3(b) illustrates the current relationships between mortgage lenders or bulk payers with tax collectors when the disclosed invention and its various embodiments ("Autoagent") is not involved
Figure 3C:
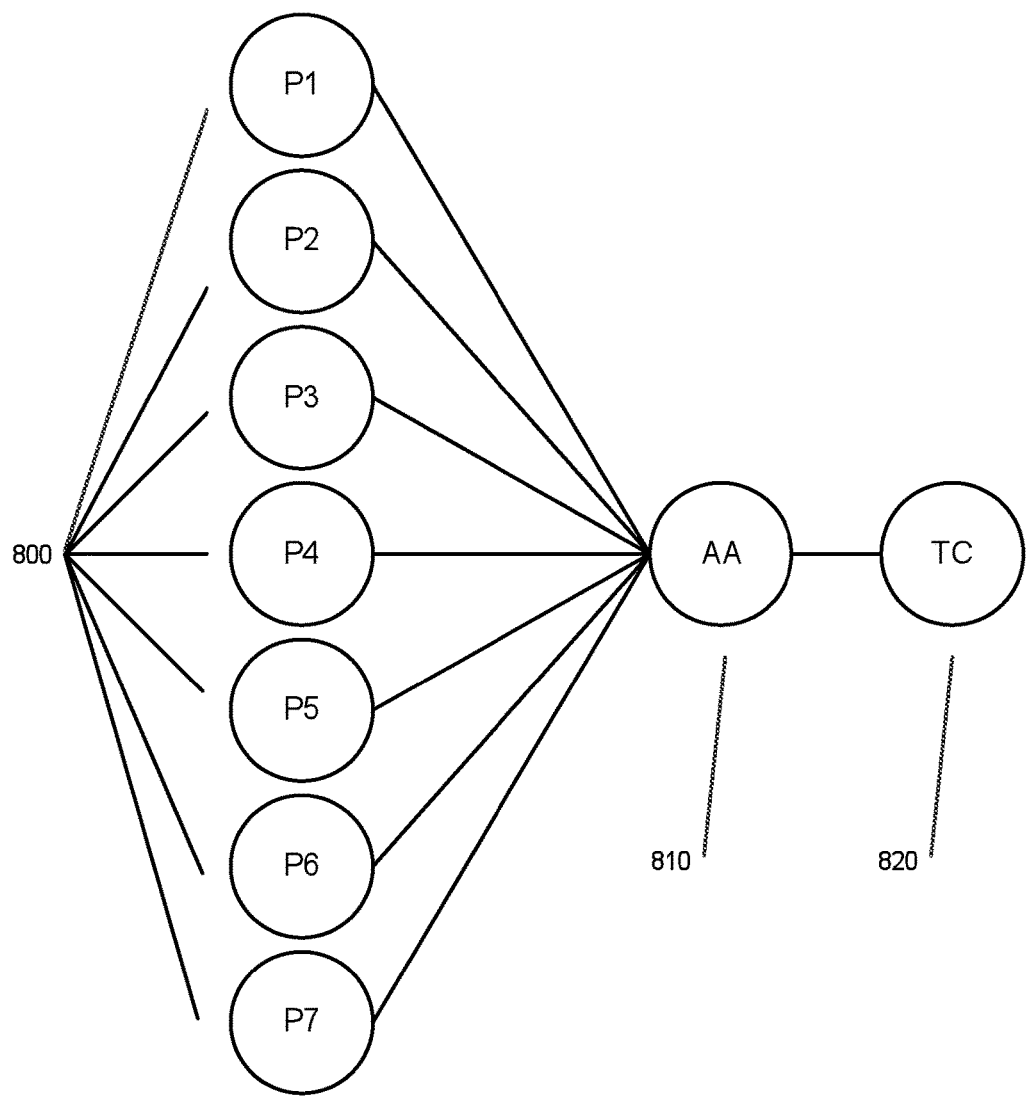
FIG. 3(c) illustrates the relationships between mortgage lenders or bulk payers with tax collectors within one embodiment of the current invention.

Autoagent may incorporate a social networking structure which may used to maintain and propagate relationships between tax collector and mortgage lenders or bulk payers, as depicted in FIG. 3(*a*). In this embodiment of the present invention, any tax collector may add to the network of payers any of the thousands of mortgage lenders or bulk payers that have an existing account on Autoagent. Tax collector TC1 635 may work with payers P1 600, P4 615 and P7 630. Tax collector TC2 640 may work with payers P1 600, P3 610, P4 615 and P6 625. Tax collector TC3 645 may work with payers P1 600, P3 610 and P6 625. Tax collector TC4 650 may work with payers P1 600, P5 620 and P7 630.

A similar configuration may be implemented for mortgage lenders and bulk payers designed such that mortgage lenders and bulk payers may request to work with the tax collector on Autoagent and tax collector may approve or decline such request. Referring to FIG. 3(*a*), Payer P1 600 may work with tax collectors TC1 635, TC2 640, TC3 645 and TC4 650. Payer P2 605 may work with tax collector TC1 635. Payer P3 610 may work with tax collectors TC2 640 and TC3 645. Payer P4 615 may work with tax collectors TC1 635 and TC2 640. Payer P5 620 can work with tax collector TC4 650. Payer P6 625 may work with tax collectors TC2 640 and TC3 645. Payer P7 630 may work with tax collectors TC1 635 and TC4 650.

When a mortgage lender or bulk payer is linked with a tax collector on Autoagent, the mortgage lender or bulk payer may, in no particular order, a) be informed by Autoagent about the tax collection efforts of that tax collector and be informed about when the tax collector is collecting property taxes; b) may be able to manage their property portfolio for that tax collector using the tools provided by Autoagent; c) may be able to view and download data reports that contain detailed property tax information for that tax collector directly through the Autoagent interface; and d) may be able to pay the tax collector all or select number of properties on their portfolio using the payment feature of the Autoagent portal.

Autoagent may automatically inform each mortgage lender or bulk payer about property tax data updates that affect the mortgage lender's or bulk payer's property portfolio for that tax collector. The mortgage lenders or bulk payers may add or delete property parcels from their portfolio for that tax collector based on the correct and accurate list of properties for which they escrow property taxes or are responsible for paying the property taxes for. The lenders may also see in real time if a property parcel in their portfolio also exists in the portfolio of another mortgage lender or bulk payer that is connected to the same tax collector and may be able to see the contact information of that other party. Autoagent may encourage each mortgage lender or bulk payer that has conflicting properties in their portfolios to contact each other in order to determine who is responsible for the payment of the property taxes for each conflicting property.

FIG. 3(*b*) illustrates the relationships between mortgage lenders or bulk payers 700 to a tax collector 710. The tax collector 710 communicates with each and every mortgage lender or bulk payer 700 to let them know when the tax collector 710 is collecting property taxes and to communicate the process that the mortgage lenders or bulk payers 700 must use in order to request the property data from the tax collector 710. Mortgage lenders or bulk payers 700 request the property data files from the tax collector 710 and the tax collector 710 has to send to each of the mortgage lenders or bulk payers 700 a data file with the property tax data.

When the property tax due date is near, each and every mortgage lender or bulk payer 700 supplies the tax collector 710 with a payment file that contains the number of property parcel records for which the mortgage lender or bulk payer 700 is planning to make payment for to the tax collector 710. The tax collector 710 receives each file, processes it, creates error reports and sends the file back to the mortgage lender or bulk payer 700 for corrections. At the end of the tax collection season the tax collector 710 refunds overpayments or duplicate payments to each and every mortgage lender or bulk payer 700 or request addition funds from the mortgage lenders or bulk payers 710 if some of the properties were underpaid.

Referring to FIG. 3(*c*), Autoagent 810 is the middleware web portal software that may facilitate and automate the property tax collection process between the tax collector 820 and mortgage companies or bulk payers 800. Those mortgage lenders or bulk payers 800 that are connected to the tax collector 820 through the social network functionality of the Autoagent system 810 may be informed by Autoagent 810 about when the tax collector 820 is collecting property taxes and what is being collected. (Referring to the type of installment of the property tax, i.e. First Installment, Second Installment, School Tax, Special Assessment Taxes, etc.).

The structure of the relationship as illustrated in FIG. 3(*c*) may allow for the automation of communication between the tax collector 820 and the mortgage lenders or bulk payers 800. Further, there may be automated property parcel conflict reporting between two mortgage lenders or bulk payers 800 and delivery of accurate payment files from Autoagent 810 to the tax collector 820 on behalf of the mortgage lenders or bulk payers 800. In case the tax collector 810 changes its internal software platform to one that requires different payment file layouts the mortgage lender or bulk payer industry 800 does not need to know about the change. Autoagent 810 programmers may re-program the payment file output parameters for the tax collector 820 to match the standard layout of the new software used by tax collector 820. The Autoagent 810 may periodically notify each mortgage lender or bulk payer 800 of when payments are due. Before the mortgage lenders or bulk payers 800 can submit the payment to the tax collector 820 through Autoagent 810, the Autoagent 810 may prompt mortgage lenders or bulk payers 800 to not duplicate their properties parcels that are conflicting in their property portfolios. The Autoagent 810 may block payment on those property parcels that are conflicting on more than one mortgage lenders' or bulk payers' portfolios.

Referring to FIG. 3(*c*), the Autoagent 800 can also function as a professional network such as LinkedIn, Facebook, Google+ or the like. The tax collector 820 may approve or decline their connections to mortgage lenders or bulk payers 800 in real-time with the Autoagent 810. The tax collector 810 may also attempt to increase the number of lenders that can be connected with the Autoagent 810 by sending a connection request called a network request to any participating mortgage lender or bulk payer that has an active account on Autoagent 810. The tax collector 810 may also send a network request to any other mortgage lender or bulk payer that does not have an active account on Autoagent 810. In addition, any participating mortgage lender not connected to the tax collector 820 through the Autoagent 810 may also make a connection request to the tax collector 820, and the tax collector 820 may decide whether to accept or decline the connection. The mortgage lenders or bulk payers already connected to the tax collector 820 may also make connection requests to connect with other tax collectors that participate on Autoagent 810.

In addition, the tax collector 820 can prevent mortgage lenders or bulk payers with a history of either not submitting payment parcels on time, or of not submitting payments, and other negative history or the like, from becoming a connection. The tax collector's 820 ability to remove a mortgage lender or bulk payer from their Autoagent 810 network can also ensure that only lenders with a proven history of submitting payment parcels and tax information on time are connected to the tax collector 820.

What is claimed is:

1. A real-time online data management system for the dissemination of tax information from a plurality of sources to a plurality of distribution targets amongst a plurality of states, jurisdictions, and tax districts, comprising:
   a. a web server component; and
   b. a unified database accessible to a plurality of sources and a plurality of distribution targets comprising a list of property parcel identification codes accessible on the web server component, wherein the web server component is a web portal operative to incorporate a social networking structure that may maintain relationships and allow automation of communication between the plurality of sources and distribution targets, wherein the web server component is a web portal operative to user registration and to create a user profile which may be stored such that the user may locate a tax information distribution target of its choice and a network request may be generated, wherein the web server component is a web portal operative to generate a network request which may be an electronic invitation to said tax information target that may request the addition of that user to said target's network of tax payers or other parties, wherein the web server component is a web portal operative to terminate a network request in response to a said target's decline of said network request;

wherein the system is operative to identify invalid property parcel identification codes that may be removed or corrected; and wherein the system is operative to block payment on the property parcel identification codes that exist in a property portfolio of more than one plurality of sources.

2. The real-time online data management system of claim 1, wherein the web server component is a web portal operative to allow a tax information target to accept a network request such that a tax information distribution target may have the option to assign a code depicting the correspondence between a user and a payer on the target's network.

3. The real-time online data management system of claim 1, wherein the web server component is a web portal operative to allow tax information distribution sources or targets to upload information onto the web portal or remove said information from the portal or validating said information against information contained in the unified database.

4. The real-time online data management system of claim 1, wherein the unified database accessible to a plurality of sources and a plurality of distribution targets may contain the tax roll of tax collectors.

5. The real-time online data management system of claim 1, wherein the system is operative to disallow invalid property parcel identification codes from being processed or submitted for payment.

6. The real-time online data management system of claim 1, wherein the system is operative to share contact information amongst tax information distribution source and targets.

7. The real-time online data management system of claim 1, wherein the system is operative to combine the total tax due for all property taxes in an uploaded portfolio.

8. The real-time online data management system of claim 1, wherein system is operative to allow a tax information distribution source or target to execute a payment action on the system.

9. The real-time online data management system of claim 1, wherein the system is operative to notify a potential tax information distribution target of an incoming payment and generate a payment file.

10. The real-time online data management system of claim 1, wherein the system is operative to notify a potential tax information distribution target of an incoming payment or inform a plurality of tax information distribution sources and targets regarding data updates.

11. The real-time online data management system of claim 1, wherein the system is operative to notify a plurality of tax information distribution sources and targets regarding conflicting tax information.

12. The real-time online data management system of claim 1, wherein the system is operative to block duplicate payments.

13. The real-time online data management system of claim 1, wherein the system is operative to generate warnings to a plurality of tax information distribution sources and targets regarding duplicate payments.

* * * * *